Jan. 5, 1932.  G. T. ANDERSON  1,839,457

ELECTRIC MOTOR

Filed March 6, 1929

INVENTOR
Gotfried T. Anderson
BY
ATTORNEYS

Patented Jan. 5, 1932

1,839,457

UNITED STATES PATENT OFFICE

GOTFRIED T. ANDERSON, OF ROCKFORD, ILLINOIS, ASSIGNOR TO HOWARD D. COLMAN, OF ROCKFORD, ILLINOIS

ELECTRIC MOTOR

Application filed March 6, 1929. Serial No. 344,660.

The invention relates generally to small capacity electric motors and in certain of its aspects refers more particularly to a motor having a vibratory armature, which through the medium of a ratchet device imparts a unidirectional rotative force to a shaft or other driven element.

Fractional horse power motors are frequently used for control purposes where rel10 atively infrequent operations for short periods of time are required. In some instances it is desirable to reduce and eliminate in so far as possible the noises incident to the transmission of mechanical vibration of the motor to the structure with which the motor is associated. It is therefore one object of my invention to provide means of a novel and advantageous character for yieldably supporting the motor magnet and armature, such means constituting a cushioned support for the motor tending to prevent transmission of mechanical vibrations to the associated structure.

Another object of the invention is to pro25 vide improved means for resiliently supporting the armature of a motor of the vibratory type.

The objects of the invention thus generally stated, together with other and ancillary ad30 vantages are attained by the construction and arrangement illustrated in the accompanying drawings forming part hereof, in which.

Figure 1:
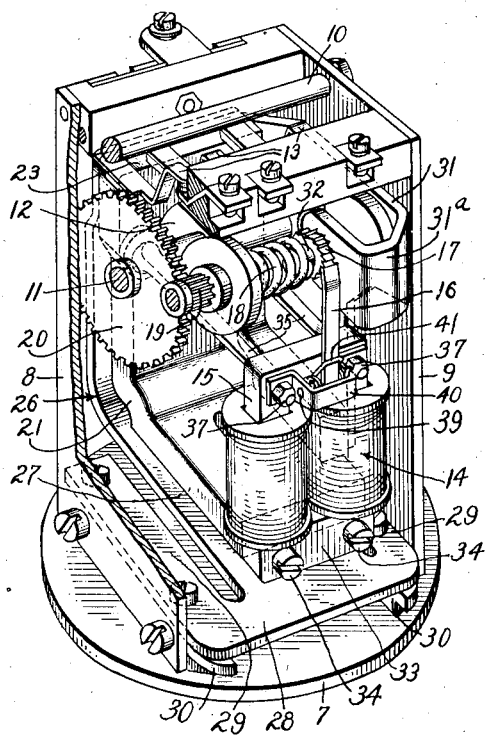
Figure 1 is a perspective view of a control unit having a vibratory motor embodied therein constructed in accordance with my invention, a portion of the frame structure being broken away for clearness.
Figure 2:
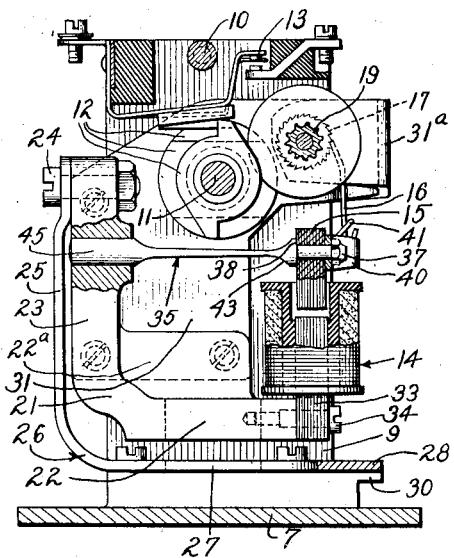
Fig. 2 is a vertical sectional view through the unit.
Figure 3:
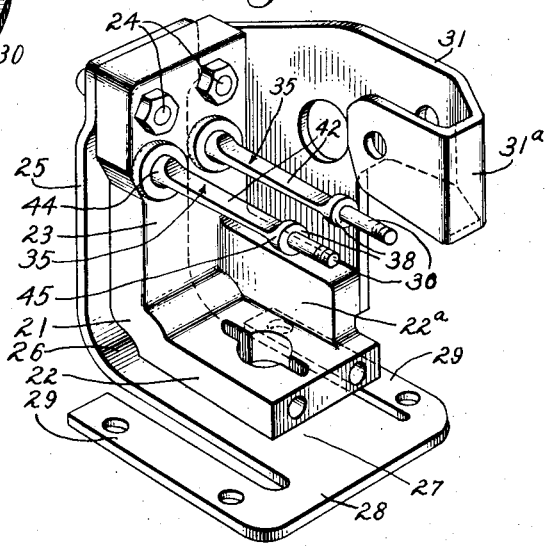

Fig. 3 is a perspective view of the means for yieldably supporting the motor magnet and the means for resiliently supporting the armature of the magnet.

Figure 4:
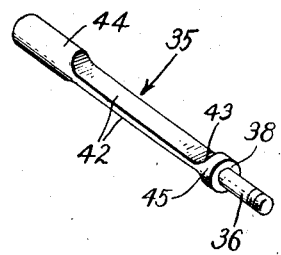

Fig. 4 is a perspective view of a spring sup45 porting arm for the motor armature.

For purposes of illustration, I have shown a control unit of the general character set forth in the copending application of Howard D. Colman and Duncan J. Stewart, filed Feb. 15, 1929, Serial No. 340,217. In said application the control unit is shown applied to the operation of a radiator control valve.

The unit comprises, as herein shown, a main frame consisting of a circular plate 7 having rigidly secured upon its upper surface a pair of opposing parallel side plates 8 and 9. The plates are rigidly connected together at their upper ends by means including a spacer rod 10. 11 indicates a shaft journaled in the main frame near the upper central portion thereof and operatively associated, in a manner not shown, with a means to be operated, such for example as the radiator control valve above referred to. Also associated with said shaft is a control mechanism consisting of one or more cams 12 for operating switch contacts 13 which control the flow of current to the motor magnet.

The motor embodied in the exemplary control unit is of the vibratory type and consists generally of a double coil electromagnet 14 having associated therewith an armature 15 arranged to vibrate in the periodic excitation of the magnet 14. A pawl 16 carried by the armature is adapted to engage a ratchet wheel 17 to rotate the same unidirectionally. Alined with the ratchet wheel and connected therewith by a flexible coiled spring coupling 18 is a pinion 19 meshing with a spur gear 20 on the drive shaft 11.

The motor proper which includes the magnet 14, the armature 15 and the ratchet wheel 17 are, according to my invention, carried by a rigid frame, herein termed the motor frame, and yieldably supported within the main frame in which is mounted the shaft 11 and driving pinion 19. The motor frame, in its preferred form, comprises a rigid angular member 21, substantially L-shaped and having a lower substantially horizontal portion or leg 22 and an upright portion or leg 23. The upper end of the upright portion 23 is rigidly secured as by means of bolts 24 to the inwardly offset upper end of a vertical arm 25 of a yielding supporting bracket 26. The latter is made of suitable resilient material and has a horizontal arm 27 (Fig. 3) formed integral with the lower end of the vertical arm 25. The forward end of the arm 27 in turn is formed integral with the bight of a U-shaped anchoring plate 28 having rearwardly extending anchoring members 29 spaced laterally from the arm 27. Said anchoring members 29 are rigidly secured upon spaced parallel ribs 30 so as to space the lower arm of the bracket from the base plate 7. Said ribs may be formed integral with the main frame plate 7 and have the lower ends of the side plates 8 and 9 secured thereto.

It will be seen that the frame member 21 is yieldably supported in nested relation to the bracket 26 but is spaced relative therefrom to permit up and down movement. At the same time the bracket is capable of yielding relative to the base plate 7 by reason of the space therebetween.

The motor frame 21 also has a vertical plate 31 rigidly secured to one side of the upright portion 23 and to a rib or flange 22ª formed at one side of the horizontal portion 22. Said plate is shaped to provide a portion 31ª at its forward upper edge which is bent back upon itself to provide spaced bearing members for a shaft 32 with which the ratchet wheel 17 is rigid.

The motor magnet 14 has a U-shaped pole piece 33 to the legs of which the magnet spools are rigidly secured. Said pole piece is in turn secured to the free end of the horizontal frame portion 22 by means of screws 34.

The armature 15 is mounted for vibratory movements in operative association with the magnet 14 by means of a pair of laterally spaced substantially parallel spring arms 35. These arms are anchored at one end in the upright rigid frame portion 23 and their free ends are reduced in diameter to form bolt-like stems 36 which are threaded to receive nuts 37 for clamping the armature rigidly against shoulders 38.

Normally the arms 35 support the armature 15 in spaced relation to the pole pieces of the magnet, the armature 15 being herein shown as substantially U-shaped with depending portions entering the upper ends of the magnet coils. The magnet is preferably periodically excited by means of an alternating electric current, so that the armature is alternately attracted to tension the spring arms and released to impart, through the medium of the pawl 16, a power impulse to the ratchet wheel 17.

The pawl 16 is mounted upon a pivot pin 39 in a bracket 40 having apertures in opposite end portions receiving the stem ends 36 of the spring arms and clamped in place by means of the nuts 37. A light spring 41 acts upon the pawl to urge it into engagement with the ratchet wheel. The teeth of the latter are shaped, it will be observed, so that in the movement of the armature away from the magnet a rotative force is applied to the wheel.

The spring arms 35 are constructed in view of the mass of the armature 15, the pawl 16 and the restraining force opposing the free vibration of the pawl, so as to provide, in the operation of the motor, a period of vibration for the armature system substantially corresponding to the frequency of the alternating current energizing the magnet. At the same time the construction is such as to prevent breakage of the arms as a result of the complicated stresses set up in various sections of the hardened spring arms by the combined flexure, shearing action attending the rapid vibration of the armature and the sudden stopping of the same when striking against the magnet pole pieces on the attracting stroke and against the ratchet wheel on the return stroke. To this end each spring arm is preferably formed from round steel stock and the desired degree of flexibilty is attained by cutting away opposite sides of the stock to form a substantially flat intermediate section which gradually increases in thickness near the ends of the arm as indicated at 43 merging into heavy cylindrical end portions 44 and 45. It has been found that the service life of the spring arms are best equipped to withstand the severe stresses encountered in service when they are anchored in the upright leg 23 of the member 21 with the cylindrical portion 44 projecting a short distance beyond the surface of the leg 23. In other words, the intermediate flat sections 42 merge into the cylindrical portion 44 adjacent to but spaced a short distance from the point of connection between the arms and the leg 23.

It will be observed that the armature supporting arms are arranged to permit bodily movement of the armature, in a direction axially of the magnet poles, and that the yieldable support for the motor unit similarly permits movement thereof only in a direction substantially perpendicular to the motor shaft. This arrangement, together with the flexible coupling connecting the motor shaft to the operative parts in the main frame, effectually minimizes the transmission of vibrations to the frame and thus reduces the wear and tear, and noise, usually incident to the operation of a vibratory motor.

Preferably the rods are made out of what is commercially known as drill rod, and the intermediate portions are reduced in thickness by milling the same on opposite sides. In the milling operation the axis of the cutter is disposed perpendicularly with respect to the axis of the rod so that any scratches on the surface of the stock will extend longitudinally of the rod rather than transversely. This is advantageous for the reason that transverse scratches occurring in the stock tend to localize the stresses, resulting in cracks which weaken the arms and cause the latter to break after a relatively short period of time.

While I have herein described my improved motor as embodied in a control unit which is particularly adapted for the operation of radiator control valves and the like, the general construction and arrangement of parts employed in the use of the motor for the purpose specified forms no part of my invention, reference being made to the copending application of Howard D. Colman and Duncan J. Stewart, Serial No. 417,989, filed January 2, 1930.

I claim as my invention:

1. A vibratory motor having, in combination, a main frame, a motor frame yieldably supported in the main frame and including a rigid substantially L-shaped member, a magnet secured to one leg of said member, a spring support anchored at one end and secured at its other end to the other leg of said member, an armature carried by the spring support in operative association with the magnet, a rotary element mounted in the moter frame, means operable in the vibration of the armature to rotate said element, and a shaft mounted in the main frame and having a flexible connection with the rotary element.

2. A vibratory motor including an electromagnet, an armature for said magnet, a rigid frame member carrying said magnet and having said armature resiliently mounted therein, and an angular spring arm anchored at one end and having said frame member secured to the other end thereof.

3. A vibratory motor including an electromagnet, an armature for said magnet, a rigid frame member carrying said magnet and having said armature resiliently mounted therein, and a spring arm anchored at one end and having said frame member secured to the other end thereof, both the frame member and the spring member being angular in form and arranged in nested but spaced relation.

4. A vibratory motor having, in combination, a substantially L-shaped resilient support anchored at one end, and a similarly shaped member having one end secured to the free end of the support, an electromagnet secured to the other end of said member, and an armature for said magnet also carried by said member, the member and the support being arranged in nested relation but spaced apart for relative movement.

5. In a power driving unit, the combination of a stationary base, a plate mounted on said base in spaced relation thereto, a spring arm constituting a part of said plate adapted for flexure relative to the plate, a rigid member having one end portion secured to the free end of said arm and the remaining portion spaced therefrom so as to permit of relative movement between the member and the arm, and an electric motor carried by said member so as to be flexibly supported from said base.

6. A vibratory motor including an electromagnet, a rigid frame for supporting said electromagnet, and supporting means for said frame comprising a stationary support, a plate having a pair of arms rigidly secured to said support so as to space the plate from the support, and a spring having one end formed integral with said plate and its other end secured to said frame.

7. A vibratory motor including a rigid L-shaped frame, an electromagnet mounted on one leg of the frame, an armature, a spring support for the armature including an arm anchored in the other leg of said frame, a member rigid with said frame and extending in a direction parallel to said arm, a shaft journalled in said member, and means operable in the vibration of the armature to impart rotative impulses to the motor shaft.

8. A vibratory motor including a rigid L-shaped frame, an electromagnet mounted on one leg of the frame, an armature, a spring support for the armature including an arm anchored in the other leg of said frame, a member rigid with said frame and extending in a direction parallel to said arm, a shaft journalled in said member, and means operable in the vibration of the armature to impart rotative impulses to the motor shaft, said member being shaped to provide spaced bearings for the motor shaft.

9. A vibratory motor comprising a rotary element, an electromagnet, an armature for said magnet mounted for vibratory movements and operatively associated with said element to impart rotary movement thereto, a spring support for the motor adapted to permit yielding movement thereof only in a direction substantially perpendicular to the axis of said element, a shaft to be driven mounted to turn on a fixed axis, and a flexible coupling between said element and said shaft.

10. A vibratory motor comprising a main frame, a shaft to be driven rotatably mounted in said frame, an electromagnet, an armature for said magnet, a supporting member carrying said magnet and having said armature resiliently mounted thereon, a spring support for said member, a driving shaft mounted on said member in end to end relation to the shaft to be driven, said magnet being adapted when energized from a source of alternating current to effect vibration of the armature, means operable in such vibration of the armature to impart rotational movement to the driving shaft, and a flexible coupling connecting said shafts.

In testimony whereof, I have hereunto affixed my signature.

GOTFRIED T. ANDERSON.